United States Patent
Keryk et al.

(10) Patent No.: US 6,803,409 B2
(45) Date of Patent: Oct. 12, 2004

(54) ORGANOPOLYSILOXANE COPOLYMER AND METHOD OF PREPARING

(76) Inventors: John Robert Keryk, P.O. Box 1709, Midland, MI (US) 48640; Dimitris Elias Katsoulis, 10-15 Hachiyama-cho, Shibuya-ku, Tokyo 150-0035 (JP); Katsuya Eguchi, 28-6 Iwahara, Minamiashigara-shi, Kanagawa (JP)

( * ) Notice: Subject to any disclaimer, the term of this patent is extended or adjusted under 35 U.S.C. 154(b) by 0 days.

(21) Appl. No.: 10/158,365

(22) Filed: May 29, 2002

(65) Prior Publication Data

US 2003/0225212 A1 Dec. 4, 2003

(51) Int. Cl.$^7$ .............. C08G 77/06; C08G 77/04; C08L 83/04
(52) U.S. Cl. .............. 524/837; 524/860; 524/863; 525/474; 525/477; 528/18; 528/31; 528/32; 528/33; 528/34
(58) Field of Search .............. 528/18, 33, 34, 528/31, 32; 525/474, 477; 524/837, 860, 863

(56) References Cited

U.S. PATENT DOCUMENTS

| | | | | |
|---|---|---|---|---|
| 3,280,214 A | * | 10/1966 | Mitchell | ............. 528/33 |
| 3,294,718 A | * | 12/1966 | Antonen | ............. 528/19 |
| 3,308,203 A | * | 3/1967 | Metevia et al. | ............. 525/477 |
| 3,629,228 A | | 12/1971 | Hartlein et al. | ............. 260/185 |
| 3,974,122 A | | 8/1976 | Sato et al. | ............. 260/37 SB |
| 4,130,599 A | * | 12/1978 | Merrill et al. | ............. 525/477 |
| 4,395,443 A | | 7/1983 | Shimizu et al. | ............. 427/387 |
| 4,529,629 A | * | 7/1985 | Liu | ............. 427/387 |
| 5,268,433 A | | 12/1993 | Ikeno et al. | ............. 525/478 |
| 5,747,608 A | | 5/1998 | Katsoulis et al. | ............. 525/477 |
| 5,830,950 A | | 11/1998 | Katsoulis et al. | ............. 525/477 |
| 6,046,283 A | | 4/2000 | Katsoulis et al. | ............. 525/477 |
| 6,254,811 B1 | * | 7/2001 | Finger et al. | ............. 264/35 |
| 6,281,285 B1 | * | 8/2001 | Becker et al. | ............. 524/837 |
| 6,518,357 B1 | | 2/2003 | Rajagopalan et al. | ....... 524/588 |

* cited by examiner

*Primary Examiner*—Jeffrey B. Robertson
(74) *Attorney, Agent, or Firm*—Larry A. Milco

(57) ABSTRACT

An organopolysiloxane copolymer, comprising (i) $R^1SiO_{3/2}$ units, (ii) random $R^2{}_2SiO_{2/2}$ units, and (iii) linear $(R^3{}_2SiO)_n$ units, wherein $R^1$ is independently hydrocarbyl or halogen-substituted hydrocarbyl, $R^2$ and $R^3$ are independently $R^1$ or H, n has an average value of from 5 to 500, the mole ratio of $R^1SiO_{3/2}$ units to $R^2{}_2SiO_{2/2}$ units is from 1 to 30, and the mole ratio of $R^1SiO_{3/2}$ units and $R^2{}_2SiO_{2/2}$ units combined to $(R^3{}_2SiO)_n$ units is from 3 to 600 when the copolymer contains aliphatic unsaturation or from 1 to 600 when the copolymer is free of aliphatic unsaturation; and a method of preparing the organopolysiloxane copolymer.

30 Claims, No Drawings

ORGANOPOLYSILOXANE COPOLYMER AND METHOD OF PREPARING

FIELD OF THE INVENTION

The present invention relates to an organopolysiloxane copolymer and more particularly to an organopolysiloxane copolymer containing trifunctional units, random difunctional units, and linear difunctional units in particular mole ratios. The present invention also relates to a method of preparing the organopolysiloxane copolymer.

BACKGROUND OF THE INVENTION

Organopolysiloxane copolymers comprising linear difunctional siloxane units and methods for their preparation are known in the art. For example, U.S. Pat. No. 3,629,228 to Hartlein et al. discloses a room temperature vulcanizable alkoxy siloxane block copolymer of a polydiorganosiloxane block and a monoorganosiloxane block being endblocked with monorganodialkoxysiloxy units.

U.S. Pat. No. 5,747,608 to Katsoulis et al. discloses a rubber-modified rigid silicone resin comprising a copolymerized reaction product of (A) an organosilicon composition selected from the group consisting of (I) an organosilicone resin, (II) hydrolyzable precursors of (I), and (III) hydrolyzate formed from (II); and (B) a silicone rubber.

U.S. Pat. No. 5,830,950 to Katsoulis et al. discloses a method of producing a rubber-modified rigid silicone resin comprising the steps of (1) dissolving in an organic solvent, the following components so as to form a solution therefrom, said components comprising: (A) an organosilicon composition selected from the group consisting of (I) an organosilicone resin, (II) hydrolyzable precursors of (I), and (III) a hydrolyzate formed from (II); (B) a silicone rubber; and (C) a condensation catalyst; (2) copolymerizing component (B) with component (A) without causing precipitation of the copolymerized product from solution or the gelation thereof; (3) devolatilizing the solution containing the copolymerized product produced from components (A) and (B); and (4) heating said devolatilized, copolymerized product to as temperature sufficient to cause the same to cure.

U.S. Pat. No. 6,046,283 to Katsoulis et al. teaches a rubber-modified rigid silicone resin comprising a copolymerized reaction product of (A) an organosilicon composition selected from the group consisting of (I) an organosilicone resin, (II) hydrolyzable precursors of (I), and (III) a hydrolyzate formed from (II); (B1) a first silicone rubber having a nonfunctional linear chain length between functional groups from 6 to 100; and (B2) a second silicone rubber having terminal functional groups and a degree of polymerization from about 200 to 1,000.

U.S. Pat. No. 4,395,443 to Shimizu et al. discloses a silicone film-forming composition comprising a condensation product of a benzene soluble polysiloxane and a silanol terminated polydiorganosiloxane in combination with a mixed solvent comprising a volatile organosilicon compound and a hydrocarbon solvent.

U.S. Pat. No. 3,974,122 to Sato et al. discloses a silicone resin molding composition comprising (a) a vinyl-containing organopolysiloxane composed of randomly copolymerized tri-, di-, and mono-functional siloxane units in specific mole fractions, (b) a vinyl-containing organopolysiloxane with at least one block composed of from 5 to 1,000 diorganosiloxane units bonded linearly to each other in an uninterrupted sequence, (c) an organohydrogenpolysiloxane, and (d) a platinum catalyst.

Although the aforementioned references describe various organopolysiloxane copolymers and methods of preparing the copolymers, they do not teach the organopolysiloxane copolymer or method of the present invention.

SUMMARY OF THE INVENTION

The present invention is directed to an organopolysiloxane copolymer, comprising (i) $R^1SiO_{3/2}$ units, (ii) random $R^2{}_2SiO_{2/2}$ units, and (iii) linear $(R^3{}_2SiO)_n$ units, wherein $R^1$ is hydrocarbyl or halogen-substituted hydrocarbyl, $R^2$ and $R^3$ are independently $R^1$ or H, n has an average value of from 5 to 500, the mole ratio of $R^1SiO_{3/2}$ units to $R^2{}_2SiO_{2/2}$ units is from 1 to 30, and the mole ratio of $R^1SiO_{3/2}$ units and $R^2{}_2SiO_{2/2}$ units combined to $(R^3{}_2SiO)_n$ units is from 3 to 600 when the copolymer contains aliphatic unsaturation or from 1 to 600 when the copolymer is free of aliphatic unsaturation.

The present invention is also directed to a method of preparing an organopolysiloxane copolymer, comprising the steps of:

(I) combining (a) an organosilane having the formula $R^1SiX^1{}_3$ and (b) an organosilane having the formula $R^2{}_2SiX^2{}_2$ with (c) water in the presence of (d) a polydiorganosiloxane having the formula $X^3(R^3{}_2SiO)_p SiR^3{}_2X^3$ and (e) an organic solvent to form a first reaction mixture comprising an organic phase and an aqueous phase, wherein $R^1$ is hydrocarbyl or halogen-substituted hydrocarbyl; $R^2$ and $R^3$ are independently $R^1$ or H; $X^1$, $X^2$, and $X^3$ are independently a hydrolysable group or —OH; p has an average value of from 4 to 499; the mole ratio of (a) to (b) is from 1 to 30; and the mole ratio of (a) and (b) combined to (d) is from 1 to 600; provided when $X^1$, $X^2$, and $X^3$ are independently a hydrolysable group that does not react with water to form an acid, or —OH, the reaction mixture contains (f) an acid catalyst;

(II) separating the organic phase from the aqueous phase;

(III) washing the organic phase with water;

(IV) adding (g) a condensation catalyst to the washed organic phase to form a second reaction mixture; and (V) distilling the second reaction mixture to remove water.

The present invention is further directed to a method of preparing an organopolysiloxane copolymer, comprising combining (a') an organosilane having the formula $R^1SiX^1{}_3$ and (b') an organosilane having the formula $R^2{}_2SiX^2{}_2$ with (c) water in the presence of (d') a polydiorganosiloxane having the formula $X^3(R^3{}_2SiO)_p SiR^3{}_2X^3$, (e) an organic solvent, and (f) an alkali catalyst, to form a reaction mixture comprising an organic phase and an aqueous phase, wherein $R^1$ is hydrocarbyl or halogen-substituted hydrocarbyl; $R^2$ and $R^3$ are independently $R^1$ or H; $X^1$, $X^2$, and $X^3$ are independently a hydrolysable group that does not react with water to form an acid, or —OH; p has an average value of from 4 to 499; the mole ratio of (a') to (b') is from 1 to 30; and the mole ratio of (a') and (b') combined to (d') is from 1 to 600; for a time and at a temperature sufficient to form the copolymer.

The organopolysiloxane copolymer of the present invention exhibits superior cohesive strength, adhesive strength, and thermal conductivity.

The method of the present invention produces organopolysiloxane copolymers in high yield from readily available starting materials. Moreover, the method can be conveniently controlled to produce organopolysiloxane copolymers having a wide range of thermal and mechanical properties.

The organopolysiloxane copolymer of the present invention can be used as a silicone adhesive to bond various inorganic and organic substrates. The organopolysiloxane copolymer can also be used as a toughening agent or an adhesion promoter in rigid materials such as silicone resins, epoxy resins, phenolic resins, polyamide resins, and cyanate ester resins. Furthermore, the organopolysiloxane copolymers can be used as an additive in thermoplastic organic polymers to improve the fire-resistance of the polymer.

These and other features, aspects, and advantages of the present invention will become better understood with reference to the following description and appended claims.

DETAILED DESCRIPTION OF THE INVENTION

An organopolysiloxane according to the present invention comprises (i) $R^1SiO_{3/2}$ units, (ii) random $R^2_2SiO_{2/2}$ units, and (iii) linear $(R^3_2SiO)_n$ units, wherein $R^1$ is hydrocarbyl or halogen-substituted hydrocarbyl, $R^2$ and $R^3$ are independently $R^1$ or H, n has an average value of from 5 to 500, the mole ratio of $R^1SiO_{3/2}$ units to $R^2_2SiO_{2/2}$ units is from 1 to 30, and the mole ratio of $R^1SiO_{3/2}$ units and $R^2_2SiO_{2/2}$ units combined to $(R^3_2SiO)_n$ units is from 3 to 600 when the copolymer contains aliphatic unsaturation or from 1 to 600 when the copolymer is free of aliphatic unsaturation.

As used herein, the term "random $R^2_2SiO_{2/2}$ units" means individual $R^2_2SiO_{2/2}$ units can be bonded to any combination of two units in the copolymer. For example, an $R^2_2SiO_{2/2}$ unit can be bonded to two other $R^2_2SiO_{2/2}$ units, a $R^1SiO_{3/2}$ unit and a $R^2_2SiO_{2/2}$ unit, two $R^1SiO_{3/2}$ units, or a $R^1SiO_{3/2}$ unit and a $(R^3_2SiO)_n$ unit. Other combinations are readily apparent and included in this definition. Also, as used herein, the term "linear $(R^3_2SiO)_n$ units" means the units contain an average of n (5 to 500) $R^3_2SiO$ siloxane units arranged in an uninterrupted linear sequence. Furthermore, as used herein, the term "aliphatic unsaturation" refers to an aliphatic carbon—carbon double bond or carbon—carbon triple bond.

The hydrocarbyl and halogen-substituted hydrocarbyl groups represented by $R^1$, $R^2$, and $R^3$ typically have from 1 to 20 carbon atoms, alternatively from 1 to 10 carbon atoms, alternatively from 1 to 6 carbon atoms. Acyclic hydrocarbyl and halogen-substituted hydrocarbyl groups containing at least 3 carbon atoms can have a branched or unbranched structure. Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl, hexadecyl, heptadecyl, and octadecyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; arylalkenyl, such as styryl and cinnamyl; and alkynyl, such as ethynyl and propynyl. Examples of halogen-substituted hydrocarbyl groups include, but are not limited to, 3,3,3-trifluoropropyl, 3-chloropropyl, chlorophenyl, and dichlorophenyl.

The subscript n in the formula of the linear units has an average value of from 5 to 500, alternatively from 7 to 400, alternatively from 10 to 350. When the average value of n is less than 5, the copolymer typically has low cohesive strength. When the average value of n is greater than the 500, the copolymer is typically too soft, as evidenced by low durometer, for use as a toughening agent.

The mole ratio of $R^1SiO_{3/2}$ units to $R^2_2SiO_{2/2}$ units is from 1 to 30, alternatively from 3 to 20, alternatively from 5 to 15. When the mole ratio of $R^1SiO_{3/2}$ units to $R^2_2SiO_{2/2}$ units is less than 1, the copolymer typically has low modulus. When the mole ratio of $R^1SiO_{3/2}$ units to $R^2_2SiO_{2/2}$ units is greater than 30, the copolymer is typically very brittle.

The mole ratio of $R^1SiO_{3/2}$ units and random $R^2_2SiO_{2/2}$ units combined to linear $(R^3_2SiO)_n$ units is from 3 to 600, alternatively from 5 to 500, alternatively from 10 to 450 when the copolymer contains aliphatic unsaturation. The mole ratio of $R^1SiO_{3/2}$ units and random $R^2_2SiO_{2/2}$ units combined to linear $(R^3_2SiO)_n$ units is from 1 to 600, alternatively from 5 to 500, alternatively from 10 to 450, when the copolymer is free of aliphatic unsaturation. When the mole ratio of $R^1SiO_{3/2}$ units and random $R^2_2SiO_{2/2}$ units combined to linear $(R^3_2SiO)_n$ units is less than 1, the copolymer typically has low modulus, low cohesive strength, and low adhesive strength. When the mole ratio is greater than 600, the copolymer is typically brittle.

The organopolysiloxane copolymer typically has a weight-average molecular weight of from 1,000 to 500,000, alternatively from 2,000 to 300,000, and a polydispersity of from 1 to 60, alternatively from 2 to 50, where the molecular weight is determined by gel permeation chromatography employing a low angle laser light scattering detector.

The structure of the organopolysiloxane copolymer is not specifically limited. The organopolysiloxane copolymer can contain up to 10 mol %, based on the total number of moles of (i), (ii), and (iii), of other types of siloxane units. For example, the copolymer can contain units having formulae selected from $R^1SiX^1_aO_{(3-a/2)}$, $R^2_2SiX^2O_{1/2}$, $R^3_2SiX^3O_{1/2}$, and $SiO_{4/2}$, wherein a is 1 or 2; $R^1$, $R^2$, and $R^3$ are as defined above; and $X^1$, $X^2$, and $X^3$ are independently a hydrolysable group, as defined below, or —OH.

The organopolysiloxane copolymer typically contains from 0.01 to 10 wt %, alternatively from 0.1 to 3.5 wt %, of silicon-bonded hydroxy groups, as determined by $^{29}SiNMR$.

Examples of organopolysiloxane copolymers include, but are not limited to, copolymers having the average formulae: $(Me_2SiO)_{73}(MePhSiO)(PhSiO_{3/2})_{26}$, $(Me_2SiO)_{52}(MePhSiO)_5(PhSiO_{3/2})_{43}$, $(Me_2SiO)_{52}(MePhSiO)_5(PhSiO_{3/2})_{43}$, and $(MePhSiO)_{46}(PhSiO_{3/2})_{54}$.

A first method of preparing an organopolysiloxane copolymer according to the present invention comprises the steps of:

(I) combining (a) an organosilane having the formula $R^1SiX^1_3$ and (b) an organosilane having the formula $R^2_2SiX^2_2$ with (c) water in the presence of (d) a polydiorganosiloxane having the formula $X^3(R^3_2SiO)_pSiR^3_2X^3$ and (e) an organic solvent to form a first reaction mixture comprising an organic phase and an aqueous phase, wherein $R^1$ is hydrocarbyl or halogen-substituted hydrocarbyl; $R^2$ and $R^3$ are independently $R^1$ or H; $X^1$, $X^2$, and $X^3$ are independently a hydrolysable group or —OH; p has an average value of from 4 to 499; the mole ratio of (a) to (b) is from 1 to 30; and the mole ratio of (a) and (b) combined to (d) is from 1 to 600; provided when $X^1$, $X^2$, and $X^3$ are independently a hydrolysable group that does not react with water to form an acid, or —OH, the reaction mixture contains (f) an acid catalyst;

(II) separating the organic phase from the aqueous phase;

(III) washing the organic phase with water;

(IV) adding (g) a condensation catalyst to the washed organic phase to form a second reaction mixture; and (V) distilling the second reaction mixture to remove water.

Organosilane (a) and organosilane (b) are combined with water in the presence of polydiorganosiloxane (d), organic solvent (e), and, when necessary, acid catalyst (f), to form a first reaction mixture comprising an organic phase and an aqueous phase.

Organosilane (a) is at least one organosilane having the formula $R^1SiX^1_3$, wherein $R^1$ is as defined and exemplified above for the organopolysiloxane copolymer of the present invention and $X^1$ is a hydrolysable group or —OH. The term "hydrolysable group" means at least 90 mol % of $X^1$ react with water under the conditions described in the present method to form a group wherein $X^1$ is replaced by —OH. Examples of hydrolysable groups include, but are not limited to, —Cl, Br, —$OR^4$, —$OCH_2CH_2OR^4$, $CH_3C(=O)O—$, $Et(Me)C=N—O—$, $CH_3C(=O)N(CH_3)—$, and —$ONH_2$, wherein $R^4$ is $C_1$ to $C_8$ hydrocarbyl or halogen-substituted hydrocarbyl.

Examples of hydrocarbyl groups represented by $R^4$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups include, but are not limited to, 3,3,3-trifluoropropyl, 3-chloropropyl, chlorophenyl, and dichlorophenyl.

Examples of organosilanes suitable for use as organosilane (a) include, but are not limited to, organotrichlorosilanes such as $CH_3SiCl_3$, $CH_3CH_2SiCl_3$, and $C_6H_5SiCl_3$; organotribromosilanes such as $CH_3SiBr_3$, $CH_3CH_2SiBr_3$, and $C_6H_5SiBr_3$; organotrialkoxysilanes such as $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5Si(OCH_2CH_3)_3$, $CH_2=CHSi(OCH_3)_3$, $CH_2=CHCH_2Si(OCH_3)_3$, and $CF_3CH_2CH_2Si(OCH_3)_3$; organotri(alkoxyethoxy)silanes such as $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, and $C_6H_5Si(OCH_2CH_2OCH_3)_3$; organotriacetoxysilanes such as $CH_3Si(OAc)_3$, $CH_3CH_2Si(OAc)_3$, and $CH_2=CHSi(OAc)_3$, wherein OAc is $CH_3C(=O)O—$; organotriiminooxysilanes such as $CH_3Si[ON=C(CH_3)CH_2CH_3]_3$; oranotriacetamidosilanes such as $CH_3Si[NHC(=O)CH_3]_3$ and $C_6H_5Si[NHC(=O)CH_3]_3$; and organotriaminooxysilanes.

Organosilane (a) can be a single organosilane or a mixture comprising two or more different organosilanes, each having the formula $R^1SiX^1_3$, wherein $R^1$ and $X^1$ are as defined and exemplified above. Methods of preparing organosilanes suitable for use as organosilane (a) are well known in the art; many of these organosilanes are commercially available.

Organosilane (b) is at least one organosilane having the formula $R^2_2SiX^2_2$, wherein $R^2$ is as defined and exemplified above for the organopolysiloxane copolymer of the present invention and $X^2$ is a hydrolysable group as defined and exemplified above for $X^1$ in organosilane (a), or —OH.

Examples of organosilanes suitable for use as organosilane (b) include, but are not limited to, organodichlorosilanes such as $(CH_3)_2SiCl_2$, $(CH_3CH_2)_2SiCl_2$, and $(C_6H_5)_2SiCl_2$; organodibromosilanes such as $(CH_3)_2SiBr_2$, $(CH_3CH_2)_2SiBr_2$, and $(C_6H_5)_2SiBr_2$; organodialkoxysilanes such as $(CH_3)_2Si(OCH_3)_2$, $(CH_3)_2Si(OCH_2CH_3)_2$, $(CH_3)_2Si(OCH_2CH_2CH_3)_2$, $(CH_3)_2Si[O(CH_2)_3CH_3]_2$, $(CH_3CH_2)_2Si(OCH_2CH_3)_2$, $(C_6H_5)_2Si(OCH_3)_2$, $(C_6H_5CH_2)_2Si(OCH_3)_2$, $(C_6H_5)_2Si(OCH_2CH_3)_2$, $(CH_2=CH)_2Si(OCH_3)_2$, $(CH_2=CHCH_2)_2Si(OCH_3)_2$, and $(CF_3CH_2CH_2)_2Si(OCH_3)_2$; organodi(alkoxyethoxy)silanes such as $(CH_3)_2Si(OCH_2CH_2OCH_3)_2$, $(CF_3CH_2CH_2)_2Si(OCH_2CH_2OCH_3)_2$, $(CH_2=CH)_2Si(OCH_2CH_2OCH_3)_2$, $(CH_2=CHCH_2)_2Si(OCH_2CH_2OCH_3)_2$, and $(C_6H_5)_2Si(OCH_2CH_2OCH_3)_2$; organodiacetoxysilanes such as $(CH_3)_2Si(OAc)_2$, $(CH_3CH_2)_2Si(OAc)_2$, and $(CH_2=CH)_2Si(OAc)_2$, wherein OAc is $CH_3C(=O)O—$; organodiiminooxysilanes such as $(CH_3)_2Si[ON=C(CH_3)CH_2CH_3]_2$; oranodiacetamidosilanes such as $(CH_3)_2Si[NHC(=O)CH_3]_2$ and $Ph_2Si[NHC(=O)CH_3]_2$, where Ph is phenyl; and organodiaminooxysilanes.

Organosilane (b) can be a single organosilane or a mixture comprising two or more different organosilanes, each having the formula $R^2_2SiX^2_2$, wherein $R^2$ and $X^2$ are as defined above. Methods of preparing organosilanes suitable for use as organosilane (b) are well known in the art; many of these organosilanes are commercially available.

Polydiorganosiloxane (d) is at least one polydiorganosiloxane having the formula $X^3(R^3_2SiO)_pR^3_2SiX^3$, wherein $R^3$ is as defined and exemplified above for the organopolysiloxane copolymer of the present invention, p has an average value of from 4 to 499, and $X^3$ is a hydrolysable group as defined and exemplified above for $X^1$ in organosilane (a), or —OH. Alternatively, subscript p has an average value of from 6 to 399 or from 9 to 349.

Examples of polydiorganosiloxanes include, but are not limited, to polydiorganosiloxanes having the following average formula: $HO[Si(CH_3)_2O]_{42}H$, $HO[Si(CH_3)_2O]_{32}H$, $HO[Si(CH_3)(C_6H_5)O]_{21}H$, $Cl(CH_3)_2SiO[Si(CH_3)_2O]_{25-50}Si(CH_3)_2Cl$, and $CH_3CO_2[Si(CH_3)_2O]_{480}COCH_3$.

Polydiorganosiloxane (d) can be a single polydiorganosiloxane or a mixture comprising two or more polydiorganosiloxanes that differ in at least one of the following properties: structure, viscosity, average molecular weight, siloxane units, and sequence. Methods of preparing polydiorganosiloxanes, such as hydrolysis and condensation of organohalosilanes, are well known in the art.

Organic solvent (e) is at least one organic solvent. The organic solvent can be any aprotic or dipolar aprotic organic solvent that is partially miscible or immiscible with water, does not react with organosilane (a), organosilane (b), polydiorganosiloxane (d), or the organopolysiloxane copolymer under the conditions of the present method, and is miscible with the organosilanes, polydiorganosiloxane, and the organopolysiloxane copolymer. As used herein, the term "partially miscible" means that the solubility of water in the solvent is less than about 0.1 g/100 g of solvent at 25° C. Preferably, the organic solvent forms a minimum boiling azeotrope with water. If the organic solvent does not form an azeotrope with water, the organic solvent preferably has a boiling point greater than the boiling point of water. Otherwise, the organic solvent may be completely removed before water during distillation step (V) of the method.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. Organic solvent (e) can be a single organic solvent or a mixture comprising two or more different organic solvents, each as defined above.

When $X^1$, $X^2$, and $X^3$ are independently a hydrolysable group that does not react with water to form an acid, or —OH, the reaction mixture contains (f) an acid catalyst. The term "hydrolysable group that does not react with water to form an acid" means the hydrolysable group does not react with water in the absence of a catalyst at any temperature from room temperature to 100° C. within several minutes, for example thirty minutes, to form an acid. Examples of hydrolysable groups that do not react with water to form an acid include, but are not limited to, —$OR^4$, —$OC_2CH_2OR^4$, Et(Me)C=N—O—, $CH_3C(=O)N(CH_3)$, and —$ONH_2$, wherein $R^4$ is as defined and exemplified above. The acid catalyst can be any acid catalyst typically used to catalyze the hydrolysis of organosilanes containing the aforementioned hydrolysable groups.

Examples of acid catalysts include, but are not limited to, inorganic acids such as hydrochloric acid, sulfuric acid, nitric acid, and hydrofluoric acid; and organic acids such as acetic acid, oxalic acid, and trifluoroacetic acid. The acid catalyst can be a single acid catalyst or a mixture comprising two or more different acid catalysts.

The first method of the present invention can be carried out in any standard reactor suitable for contacting organohalosilanes with water. Suitable reactors include glass and Teflon-lined glass reactors. Preferably, the reactor is equipped with a means of agitation, such as stirring.

Organosilanes (a) and (b) are typically combined with water in the presence of polydiorganosiloxane (d), organic solvent (e), and, when present, acid catalyst (f), by adding (a) and (b), individually or as a mixture, to a mixture of water, (d), (e), and (f) and then mixing the combination. Organosilanes (a) and (b) can be mixed together before combining with water, provided the organosilanes do not react with each other. Otherwise, organosilanes (a) and (b) can be added separately, but simultaneously, in their original mole ratio to water. The organosilanes can be added directly to the water or diluted in an organic solvent and added to the mixture. Reverse addition, i.e., addition of water to a mixture of components (a), (b), (d), (e), and (f) is also possible. However, reverse addition may result in formation of organopolysiloxanes containing predominately $R^1SiO_{3/2}$ units and $R^2SiO_{2/2}$ units.

The rate of addition of (a) and (b) to water is typically from 10 to 50 mL/min for a 2,000 mL reaction vessel equipped with an efficient means of stirring. When the rate of addition is too slow, the reaction time is unnecessarily prolonged. When the rate of addition is too fast, the reaction mixture may form a gel.

Organosilanes (a) and (b) are typically combined with water at a temperature of from 0 to 120° C., alternatively from 25 to 100° C., alternatively from 50 to 80° C. When the temperature is less than 0° C., the rate of reaction is typically very slow. When the temperature is greater than 120° C., the reaction mixture may form a gel.

The combination of components (a) through (f) is mixed for an amount of time sufficient to complete hydrolysis of the hydrolysable groups in (a), (b), and (d). As used herein, the term "to complete hydrolysis" means that at least 90 mol % of the hydrolysable groups, based on the total moles of hydrolysable groups originally present in components (a), (b), and (d), are hydrolyzed. The time of mixing depends on a number of factors, such as the type of hydrolysable group(s), the structure of the organosilanes, and temperature. The time of mixing is typically from several minutes to several hours. The optimum time of mixing can be determined by routine experimentation using the methods set forth in the Examples section below. When $X^1$, $X^2$, and $X^3$ are all —OH, the combination is typically mixed from 0.5 to 6 h, alternatively from 0.5 to 3 h.

The mole ratio of organosilane (a) to organosilane (b) is from 1 to 30, alternatively from 3 to 20, alternatively from 5 to 15. When the mole ratio of organosilane (a) to organosilane (b) is less than 1, the copolymer typically has low modulus. When the mole ratio is greater than 30, the copolymer is typically very brittle.

The mole ratio of organosilane (a) and organosilane (b) combined to polydiorganosiloxane (d) is from 1 to 600, alternatively from 5 to 500, alternatively from 10 to 450. When the mole ratio of organosilane (a) and organosilane (b) combined to polydiorganosiloxane (d) is less than 1, the copolymer typically has low modulus, low cohesive strength, and low adhesive strength. When the mole ratio is greater than 600, the copolymer is typically brittle. In one embodiment of the present method, the mole ratio of organosilane (a) and organosilane (b) combined to polydiorganosiloxane (d) is from 3 to 600, alternatively from 5 to 500, alternatively from 10 to 450 and the organopolysiloxane copolymer contains aliphatic unsaturation.

The concentration of water in the reaction mixture depends on the nature of $X^1$, $X^2$, and $X^3$. When at least one of $X^1$, $X^2$, and $X^3$ is a hydrolysable group, the concentration of water is sufficient to effect hydrolysis of the hydrolysable groups in organosilane (a), organosilane (b), and polydiorganosiloxane (c). For example, the concentration of water is typically from 5 to 50 moles, alternatively from 15 to 40 moles, per mole of hydrolysable group in organosilane (a), organosilane (b), and polydiorganosiloxane (d) combined. When $X^1$, $X^2$, and $X^3$ are all —OH, only a trace amount, e.g., 100 ppm of water is required in the reaction mixture.

The concentration of organic solvent (e) is typically from 50 to 90 wt %, alternatively from 60 to 80 wt %, based on the total weight of the first reaction mixture.

When used, the concentration acid catalyst (f) is sufficient to catalyze the hydrolysis of the hydrolysable groups in (a), (b), and (d). For example, the concentration of the acid catalyst is typically from 0.1 to 10 wt %, alternatively form 0.1 to 3 wt %, alternatively from 0.1 to 1 wt %. When the concentration of the acid catalyst is less than 0.1 wt % the rate of hydrolysis of the hydrolysable groups may be too slow for commercial applications. When the concentration of the acid catalyst is greater than 10 wt %, additional washings typically are required to remove the acid. Also, excess acid may result in incomplete hydrolysis of the hyrolysable groups. When $X^1$, $X^2$, and $X^3$ are all —OH, the concentration of the acid catalyst is typically from 0.1 to 3 wt %, alternatively from 0.1 to 1 wt %.

The organic phase of the first reaction mixture is separated from the aqueous phase. The separation can be carried out by discontinuing agitation of the mixture, allowing the mixture to separate into two layers, and removing the aqueous or organic layer.

The organic phase, isolated as described above, is washed with water. The water can further comprise a neutral inorganic salt, such as sodium chloride, to minimize formation of an emulsion between the water and organic phase during washing. The concentration of the neutral inorganic salt in the water can be up to saturation. The organic phase can be washed by intermixing it with water, allowing the mixture to separate into two layers, and removing the aqueous layer. The organic phase is typically washed from 4 to 10 times with separate portions of water. The volume of water per wash is typically from 0.5 to 1 times the volume of the organic phase. The mixing can be carried out by conventional methods, such as stirring or shaking.

A condensation catalyst is added to the washed organic phase to form a second reaction mixture. Condensation catalyst (g) can be any condensation catalyst typically used to promote condensation of silicon-bonded hydroxy (silanol) groups to form Si—O—Si linkages. Examples of condensation catalysts include, but are not limited to, tin(II) and tin(IV) compounds such as tin dilaurate, tin dioctoate, and tetrabutyl tin; and titanium compounds such as titanium tetrabutoxide. Condensation catalyst (g) can be a single condensation catalyst or a mixture comprising two or more different condensation catalysts.

The concentration condensation catalyst (g) is typically from 0.1 to 10 wt %, alternatively from 0.5 to 5 wt %, alternatively from 1 to 3 wt %, based on the total weight of components (a) through (g).

The second reaction mixture is distilled to remove water. The distillation can be carried out at atmospheric or subatmospheric pressure. The distillation is typically carried out at a temperature of from 80 to 110° C., alternatively from 90 to 110° C. at 100 kPa. The distillation is typically continued until the distillate is free of water.

The organopolysiloxane resin can be recovered from the second reaction mixture by filtering the reaction mixture remaining after distillation to remove the condensation catalyst and then removing the solvent by evaporation.

A second method of preparing an organopolysiloxane copolymer according to the present invention comprises combining (a') an organosilane having the formula $R^1SiX^1_3$ and (b') an organosilane having the formula $R^2_2SiX^2_2$ with (c) water in the presence of (d') a polydiorganosiloxane having the formula $X^3(R^3_2SiO)_pSiR^3_2X^3$, (e) an organic solvent, and (f) an alkali catalyst, to form a reaction mixture comprising an organic phase and an aqueous phase, wherein $R^1$ is hydrocarbyl or halogen-substituted hydrocarbyl; $R^2$ and $R^3$ are independently $R^1$ or H; $X^1$, $X^2$, and $X^3$ are independently a hydrolysable group that does not react with water to form an acid, or —OH; p has an average value of from 4 to 499; the mole ratio of (a') to (b') is from 1 to 30; and the mole ratio of (a') and (b') combined to (d') is from 1 to 600; for a time and at a temperature sufficient to form the copolymer.

In the second method, organosilane (a') and organosilane (b') are combined with water in the presence of polydiorganosiloxane (d'), organic solvent (e), and alkali catalyst (f) to form a reaction mixture comprising an organic phase and an aqueous phase.

Organosilane (a') is at least one organosilane having the formula $R^1SiX^1_3$, wherein $R^1$ is as defined and exemplified above for the organopolysiloxane copolymer of the present invention and $X^1$ is a hydrolysable group that does not react with water to form an acid, or —OH. The term "hydrolysable group that does not react with water to form an acid" is as defined above. Examples of hydrolysable groups that do not react with water to form an acid are as defined and exemplified above for $X^1$ in organosilane (a) of the first method.

Examples of organosilanes suitable for use as organosilane (a') include, but are not limited to, organotrialkoxysilanes such as $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si$ (OCH$_2$CH$_3$)$_3$, $C_6H_5Si(OCH_3)_3$, $C_6H_5CH_2Si(OCH_3)_3$, $C_6H_5Si(OCH_2CH_3)_3$ $CH_2$=CHSi(OCH$_3$)$_3$, $CH_2$∇CHCH$_2$Si(OCH$_3$)$_3$, and $CF_3CH_2CH_2Si(OCH_3)_3$; organotri(alkoxyethoxy)silanes such as $CH_3Si(OCH_2CH_2OCH_3)_3$, $CF_3CH_2CH_2Si(OCH_2CH_2OCH_3)_3$, $CH_2$=CHSi(OCH$_2$CH$_2$OCH$_3$)$_3$, $CH_2$=CHCH$_2$Si (OCH$_2$CH$_2$OCH$_3$)$_3$, and $C_6H_5Si(OCH_2CH_2OCH_3)_3$; organotriiminooxysilanes such as $CH_3Si[ON$=$C(CH_3)CH_2CH_3]_3$; oranotriacetamidosilanes such as $CH_3Si[NHC($=$O)CH_3]_3$ and $C_6H_5Si[NHC($=$O)CH_3]_3$; and organotriaminooxysilanes.

Organosilane (a') can be a single organosilane or a mixture comprising two or more different organosilanes, each having the formula $R^1SiX^1_3$, wherein $R^1$ and $X^1$ are as defined and exemplified above in the second method. Methods of preparing organosilanes suitable for use as organosilane (a') are well known in the art; many of these organosilanes are commercially available.

Organosilane (b') is at least one organosilane having the formula $R^2_2SiX^2_2$, wherein $R^2$ is as defined and exemplified above for the organopolysiloxane copolymer of the present invention and $X^2$ is a hydrolysable group that does not react with water to form an acid, as defined and exemplified above for $X^1$ in organosilane (a'), or —OH.

Examples of organosilanes suitable for use as organosilane (b') include, but are not limited to, organodialkoxysilanes such as $(CH_3)_2Si(OCH_3)_2$, $(CH_3)_2Si(OCH_2CH_3)_2$, $(CH_3)_2Si(OCH_2CH_2CH_3)_2$, $(CH_3)_2Si[O(CH_2)_3CH_3]_2$, $(CH_3CH_2)_2Si(OCH_2CH_3)_2$, $(C_6H_5)_2Si(OCH_3)_2$, $(C_6H_5CH_2)_2Si(OCH_3)_2$, $(C_6H_5)_2Si(OCH_2CH_3)_2$, $(CH_2\nabla CH)_2Si(OCH_3)_2$, $(CH_2$=CHCH$_2$)$_2$Si(OCH$_3$)$_2$, and $(CF_3CH_2CH_2)_2Si(OCH_3)_2$; organodi(alkoxyethoxy)silanes such as $(CH_3)_2Si(OCH_2CH_2OCH_3)_2$, $(CF_3CH_2CH_2)_2Si$ (OCH$_2$CH$_2$OCH$_3$)$_2$, $(CH_2$=CH)$_2$Si(OCH$_2$CH$_2$OCH$_3$)$_2$, $(CH_2$=CHCH$_2$)$_2$Si(OCH$_2$CH$_2$OCH$_3$)$_2$, and $(C_6H_5)_2Si$ (OCH$_2$CH$_2$OCH$_3$)$_2$; organodiiminooxysilanes such as $(CH_3)_2Si[ON$=$C(CH_3)CH_2CH_3]_2$; oranodiacetamidosilanes such as $(CH_3)_2Si[NHC($=$O)CH_3]_2$ and $Ph_2Si[NHC($=$O)CH_3]_2$, where Ph is phenyl; and organodiaminooxysilanes.

Organosilane (b') can be a single organosilane or a mixture comprising two or more different organosilanes, each having the formula $R^2SiX^2_2$, wherein $R^2$ and $X^2$ are as defined above in the second method. Methods of preparing organosilanes suitable for use as organosilane (b') are well known in the art; many of these organosilanes are commercially available.

Polydiorganosiloxane (d') is at least one polydiorganosiloxane having the formula $X^3(R^3_2SiO)_pR^3_2SiX^3$, wherein $R^3$ is as defined and exemplified above for the organopolysiloxane copolymer of the present invention, p has an average value of from 4 to 499, and $X^3$ is a hydrolysable group that does not react with water to form an acid, as defined and exemplified above for $X^1$ in organosilane (a'), or —OH. Alternatively, subscript p has an average value of from 6 to 399 or from 9 to 349.

Examples of polydiorganosiloxanes suitable for use as polydiorganosiloxane (d') include, but are not limited, to polydiorganosiloxanes having the following average formula: $CH_3[OSi(CH_3)_2]_{12}OCH_3$, $CH_3[OSi(CH_3)_2]_{23}OCH_3$, and $H_2N(CH_3)_2SiO[Si(CH_3)_2O]_{4-6}Si(CH_3)_2NH_2$.

Polydiorganosiloxane (d') can be a single polydiorganosiloxane or a mixture comprising two or more polydiorganosiloxanes that differ in at least one of the following properties: structure, viscosity, average molecular weight, siloxane units, and sequence. Methods of preparing polydiorganosiloxanes, such as hydrolysis and condensation of organohalosilanes, are well known in the art.

Organic solvent (e) is at least one organic solvent as defined and exemplified above for the organic solvent in the first method.

Alkali catalyst (f) can be any alkali catalyst typically used to promote the hydrolysis of organosilanes containing hydrolysable groups that do not react with water to form an acid. Examples of hydrolysable groups that do not react with water to form an acid include, but are not limited to, —$OR^4$, —$OCH_2CH_2OR^4$, Et(Me)C=N—O—, $CH_3C(=O)N(CH_3)$—, and —$ONH_2$, wherein $R^4$ is as defined and exemplified above for the first method.

Examples of alkali catalysts include, but are not limited to, inorganic bases such as sodium hydroxide, potassium hydroxide, ammonium hydroxide; and organic bases such as tetramethylammonium hydroxide, tetrabutylammonium hydroxide, and tetrabutylphosphonium hydroxide. The alkali catalyst can be a single acid catalyst or a mixture comprising two or more different alkali catalysts.

The second method of the present invention can be carried out in any standard reactor suitable for contacting organoalkoxysilanes with water. Suitable reactors include glass and Teflon-lined glass reactors. Preferably, the reactor is equipped with a means of agitation, such as stirring.

Organosilanes (a') and (b') are typically combined with water in the presence of polydiorganosiloxane (d'), organic solvent (e), and alkali catalyst (f) by adding organosilanes (a') and (b'), individually or as a mixture, to a mixture of water, (d'), (e), and (f) and then mixing the combination. Organosilanes (a') and (b') can be mixed together before combining with water, provided the organosilanes do not react with each other. Otherwise, organosilanes (a') and (b') can be added separately, but simultaneously, in their original mole ratio to water. The organosilanes can be added directly to the water or diluted in an organic solvent and added to the water. Reverse addition, i.e., addition of water to a mixture of components (a'), (b'), (d'), (e), and (f) is also possible. However, reverse addition may result in formation of organopolysiloxanes containing predominately $R^1SiO_{3/2}$ units and $R^2SiO_{2/2}$ units.

The rate of addition of (a') and (b') to water is typically from 10 to 50 mL/min for a 2,000 mL reaction vessel equipped with an efficient means of stirring. When the rate of addition is too slow, the reaction time is unnecessarily prolonged. When the rate of addition is too fast, the reaction mixture may form a gel.

Organosilanes (a') and (b') are typically combined with water for a time and at a temperature sufficient to form the organopolysiloxane copolymer. The temperature is typically from 0 to 120° C., alternatively from 25 to 100° C., alternatively from 50 to 80° C. When the temperature is less than 0° C., the rate of reaction is typically very slow. When the temperature is greater than 120° C., the reaction mixture may form a gel. The time of mixing depends on a number of factors, such as the type of hydrolysable group(s), the structure of the organosilanes, the mole ratios of starting materials, and temperature. The reaction time is typically from several minutes to several hours. For example, the reaction time is typically from 0.5 to 5 hours at a temperature of from 25 to 100° C., alternatively from 1 to 3 hours at a temperature of from 50 to 80° C. The resulting organopolysiloxane typically has a weight-average molecular weight of from 1,000 to 500,000, alternatively from 2,000 to 300,000. The optimum temperature and time can be determined by routine experimentation using the methods set forth in the Examples section below.

The mole ratio of organosilane (a') to organosilane (b') is from 1 to 30, alternatively from 3 to 20, alternatively from 5 to 15. When the mole ratio of organosilane (a') to organosilane (b') is less than 1, the copolymer typically has low modulus. When the mole ratio is greater than 30, the copolymer is typically very brittle.

The mole ratio of organosilane (a') and organosilane (b') combined to polydiorganosiloxane (d') is from 1 to 600, alternatively from 5 to 500, alternatively from 10 to 450. When the mole ratio of organosilane (a') and organosilane (b') combined to polydiorganosiloxane (d') is less than 1, the copolymer typically has low modulus, low cohesive strength, and low adhesive strength. When the mole ratio is greater than 600, the copolymer is typically brittle. In one embodiment of the present method, the mole ratio of organosilane (a') and organosilane (b') combined to polydiorganosiloxane (d') is from 3 to 600, alternatively from 5 to 500, alternatively from 10 to 450 and the organopolysiloxane copolymer contains aliphatic unsaturation.

The concentration of water in the reaction mixture depends on the nature of $X^1$, $X^2$, and $X^3$. When at least one of $X^1$, $X^2$, and $X^3$ is a hydrolysable group, the concentration of water is sufficient to effect hydrolysis of the hydrolysable groups in organosilane (a'), organosilane (b'), and polydiorganosiloxane (d'). For example, the concentration of water is typically from 5 to 50 moles, alternatively from 15 to 40 moles, per mole of hydrolysable group in organosilane (a'), organosilane (b'), and polydiorganosiloxane (d') combined. When $X^1$, $X^2$, and $X^3$ are all —OH, only a trace amount, e.g., 100 ppm, of water is required in the reaction mixture.

The concentration of organic solvent (e) is typically from 50 to 90 wt %, alternatively from 60 to 80 wt %, based on the total weight of the reaction mixture.

The concentration of alkali catalyst (f) is sufficient to catalyze the hydrolysis of the hydrolysable groups in organosilanes (a') and (b') and polydiorganosiloxane (d'). For example, the concentration of the alkali catalyst is typically from 0.1 to 5 wt %, alternatively form 0.1 to 3 wt %, alternatively from 0.1 to 1 wt %. When the concentration of the alkali catalyst is less than 0.1 wt %, the rate of hydrolysis of the hydrolysable groups may be too slow for commercial applications. When the concentration of the alkali catalyst is greater than 5 wt %, the molecular weight of the copolymer is typically very low. When $X^1$, $X^2$, and $X^3$ are all —OH, the concentration of the alkali catalyst is typically from 0.1 to 5 wt %, alternatively from 0.1 to 1 wt %.

The organopolysiloxane resin can be recovered from the reaction mixture by neutralizing the reaction mixture with an inorganic acid, separating the organic phase from the aqueous phase, and then removing the organic solvent by evaporation.

The organopolysiloxane copolymer of the present invention exhibits superior cohesive strength, adhesive strength, and thermal conductivity.

The method of the present invention produces organopolysiloxane copolymers in high yield from readily available starting materials. Moreover, the method can be conveniently controlled to produce organopolysiloxane copolymers having a wide range of thermal and mechanical properties.

The organopolysiloxane copolymer of the present invention can be used as a silicone adhesive to bond various inorganic substrates, such as glass or aluminum, and organic substrates, such as Teflon. The organopolysiloxane copolymer can also be used as a toughening agent or an adhesion promoter in rigid materials such as silicone resins, epoxy resins, phenolic resins, and polyamide resins. Furthermore, the organopolysiloxane copolymers can be used as an additive in thermoplastic organic polymers to improve the fire-resistance of the polymer.

EXAMPLES

The following examples are presented to further illustrate the method of the present invention, but are not to be considered as limiting the invention, which is delineated in the appended claims. The molecular weights of the hydroxy-terminated polydimethylsiloxane and polymethylphenylsiloxane polymers and formulas of the organopolysiloxane copolymers were determined by $^{29}$SiNMR.

Example 1

A hydroxy-terminated polydimethylsiloxane (100.5 g, MW=3126 g/mol), 855.3 g of water, and 147.5 g of toluene were combined in a two-liter three-necked flask equipped with a thermometer, mechanical stirrer, and condenser. To this mixture was added a solution of 99.6 g of phenyltrichlorosilane and 9.90 g of methylphenyldichlorosilane in 87.2 g of toluene during a period of 15 minutes. The resulting mixture was stirred for 45 minutes at ambient temperature, after which time the organic and aqueous layers were separated. The organic layer was washed with an aqueous sodium chloride solution (50% w/v), dried over anhydrous MgSO$_4$, and gravity-filtered through filter paper. Toluene (102 g) and 3.0 g of zinc octoate were added to the filtrate. The mixture was placed in a one-liter three-necked flask equipped with a mechanical stirrer, condenser, and Dean-Stark trap. The mixture was subjected to azeotropic distillation for 50 minutes, during which time 2 g of water collected in the trap. The mixture was allowed to cool to room temperature and then filtered through Celite® filter agent supported on a glass frit in a Buchner funnel. The solvent was removed under reduced pressure using a rotary evaporator to give 114.4 g of a rubbery solid having the average formula (Me$_2$SiO)$_{73}$(MePhSiO)(PhSiO$_{3/2}$)$_{26}$, as determined by $^{29}$Si NMR.

Example 2

A hydroxy-terminated polydimethylsiloxane (200 g, MW=23600 g/mol), 1712 g of water, and 288 g of toluene were combined in a five-liter three-necked flask equipped with a thermometer, mechanical stirrer, and condenser. To this mixture was added a solution of 343 g of phenyltrichlorosilane and 34.2 g of methylphenyldichlorosilane in 288 g of toluene during a period of 20 minutes. The resulting mixture was stirred for 45 minutes at ambient temperature, after which time the organic and aqueous layers were separated. The organic layer was washed with an aqueous sodium chloride solution (50% w/v) and then subjected to azeotropic distillation at 120° C. to remove water. To the dried solution was added 1546.8 g of toluene and 10 g of zinc octoate. The mixture was placed in a two-liter three-necked flask equipped with a mechanical stirrer, condenser, and Dean-Stark trap. The mixture was refluxed for 4 h, during which time 6.8 g of water was collected in the trap. The mixture was allowed to cool to room temperature and then filtered through Celite supported on a glass frit in a Buchner funnel. The solvent was removed under reduced pressure using a rotary evaporator to give 367.1 g of a rubbery solid having the average formula (Me$_2$SiO)$_{52}$(MePhSiO)$_5$(PhSiO$_{3/2}$)$_{43}$, as determined by $^{29}$Si NMR.

Example 3

A hydroxy-terminated polydimethylsiloxane (115.0 g, MW=960 g/mol), 968.5 g of water, and 170 g of toluene were combined in a two-liter three-necked flask equipped with a thermometer, mechanical stirrer, and condenser. To this mixture was added a solution of 190.1 g of phenyltrichlorosilane and 18.9 g of methylphenyldichlorosilane in 170 g of toluene during a period of 20 minutes. The resulting mixture was stirred for 50 minutes at ambient temperature, after which time the organic and aqueous layers were separated. The organic layer was washed with an aqueous sodium chloride solution (50% w/v) and then subjected to azeotropic distillation at 120° C. to remove water. To the dried solution was added 365.4 g of toluene and 5 g of zinc octoate. The mixture was placed in a two-liter three-necked flask equipped with a mechanical stirrer, condenser, and Dean-Stark trap. The mixture was refluxed for 4 h, during which time 6.8 g of water was collected in the trap. The mixture was allowed to cool to room temperature and then filtered through Celite supported on a glass frit in a Buchner funnel. The solvent was removed under reduced pressure using a rotary evaporator to give 211.6 g of a rubbery solid having the average formula (Me$_2$SiO)$_{52}$(MePhSiO)$_5$(PhSiO$_{3/2}$)$_{43}$, as determined by $^{29}$Si NMR.

Example 4

A hydroxy-terminated polymethylphenylsiloxane (122.4 g, MW=2880 g/mol), 795 g of water, and 141.6 g of toluene were combined in a two-liter three-necked flask equipped with a thermometer, mechanical stirrer, and condenser. To this mixture was added a solution of 156.1 g of phenyltrichlorosilane and 20.1 g of methylphenyldichlorosilane in 139.6 g of toluene during a period of 45 minutes. The resulting mixture was stirred for 4.5 h at ambient temperature, after which time the organic and aqueous layers were separated. The organic layer was washed with an aqueous sodium chloride solution (50% w/v) and then subjected to azeotropic distillation at 120° C. to remove water. To the dried solution was added 3 g of zinc octoate. The mixture was placed in a two-liter three-necked flask equipped with a mechanical stirrer, condenser, and Dean-Stark trap. The mixture was refluxed for 4 h, during which time 2.1 g of water was collected in the trap. The mixture was allowed to cool to room temperature and then filtered through Celite supported on a glass frit in a Buchner funnel. The solvent was removed under reduced pressure using a rotary evaporator to give 139.2 g of a rubbery solid having the average formula (MePhSiO)$_{46}$(PhSiO$_{3/2}$)$_{54}$, as determined by $^{29}$Si NMR.

That which is claimed is:

1. An organopolysiloxane copolymer, comprising (i) R$^1$SiO$_{3/2}$ units, (ii) random R$^2{}_2$SiO$_{2/2}$ units, and (iii) linear (R$^3{}_2$SiO)$_n$ units, wherein R$^1$ is independently hydrocarbyl or halogen-substituted hydrocarbyl, R$^2$ and R$^3$ are independently R$^1$ or H, n has an average value of from 5 to 500, the mole ratio of R$^1$SiO$_{3/2}$ units to R$^2{}_2$SiO$_{2/2}$ units is from 1 to 30, and the mole ratio of R$^1$SiO$_{3/2}$ units and R$^2{}_2$SiO$_{2/2}$ units combined to (R$^3{}_2$SiO)$_n$ units is from 1 to 600 provided the copolymer is free of aliphatic unsaturation.

2. The copolymer according to claim 1, wherein n is from 7 to 400.

3. The copolymer according to claim 1, wherein the mole ratio of R$^1$SiO$_{3/2}$ units to R$^2{}_2$SiO$_{3/2}$ units is from 3 to 20.

4. The copolymer according to claim 1, wherein the mole ratio of R$^1$SiO$_{3/2}$ units and R$^2{}_2$SiO$_{2/2}$ units combined to (R$^3{}_2$SiO)$_n$ units is from 5 to 500.

5. The copolymer according to claim 1, wherein the copolymer has a weight-average molecular weight of from 2,000 to 300,000.

6. The copolymer according to claim 1, wherein the copolymer contains from 0.1 to 3.5 wt % of silicon-bonded hydroxy groups.

7. A method of preparing an organopolysiloxane copolymer, comprising the steps of:

(I) combining (a) an organosilane having the formula $R^1SiX^1_3$ and (b) an organosilane having the formula $R^2_2SiX^2_2$ with (c) water in the presence of (d) a polydiorganosiloxane having the formula $X^3(R^3_2SiO)_p SiR^3_2X^3$ and (e) an organic solvent to form a first reaction mixture comprising an organic phase and an aqueous phase, wherein $R^1$ is independently hydrocarbyl or halogen-substituted hydrocarbyl; $R^2$ and $R^3$ are independently $R^1$ or H; $X^1$, $X^2$, and $X^3$ are independently a hydrolysable group or —OH; p has an average value of from 4 to 499; the mole ratio of (a) to (b) is from 1 to 30; and the mole ratio of (a) and (b) combined to (d) is from 1 to 600; provided when $X^1$, $X^2$, and $X^3$ are independently a hydrolysable group that does not react with water to form an acid, or —OH, the reaction mixture contains (f) an acid catalyst;

(II) separating the organic phase from the aqueous phase;

(III) washing the organic phase with water;

(IV) adding (g) a condensation catalyst to the washed organic phase to form a second reaction mixture; and (V) distilling the second reaction mixture to remove water.

8. The method according to claim 7, wherein $X^1$, $X^2$, and $X^3$ are independently —Cl, Br, —$OR^4$, —$OCH_2CH_2OR^4$, $CH_3C(=O)O$—, $Et(Me)C=N$—O—, $CH_3C(=O)N(CH_3)$—, —$ONH_2$, or —OH, wherein $R^4$ is $C_1$ to $C_8$ hydrocarbyl or halogen-substituted hydrocarbyl.

9. The method according to claim 8, wherein $X^1$, $X^2$, and $X^3$ are independently —Cl, Br, —$OR^4$, —$OCH_2CH_2OR^4$, $CH_3C(=O)O$—, or —OH, wherein $R^4$ is $C_1$ to $C_8$ hydrocarbyl or halogen-substituted hydrocarbyl.

10. The method according to claim 7, wherein $X^3$ is —OH.

11. The method according to claim 10, wherein $X^1$ and $X^2$ are —Cl.

12. The method according to claim 7, wherein at least one of $X^1$, $X^2$, and $X^3$ is a hydrolysable group and the concentration of (c) water is from 15 to 40 moles per mole of hydrolysable group in organosilane (a), organosilane (b), and polydiorganosiloxane (d) combined.

13. The method according to claim 7, wherein p has an average value of from 6 to 399.

14. The method according to claim 7, wherein the mole ratio of (a) to (b) is from 3 to 20.

15. The method according to claim 7, wherein the mole ratio of (a) and (b) combined to (d) is from 5 to 500.

16. The method according to claim 7, wherein the organic solvent forms an azeotrope with water.

17. The method according to claim 7, wherein $X^1$, $X^2$, and $X^3$ are independently a hydrolysable group that does not react with water to form an acid, or —OH.

18. The method according to claim 17, wherein $X^1$, $X^2$, and $X^3$ are independently —$OR^4$, —$OCH_2CH_2OR^4$, $Et(Me)C=N$—O—, $CH_3C(=O)N(CH_3)$—, —$ONH_2$, or —OH, wherein $R^4$ is $C_1$ to $C_8$ hydrocarbyl or halogen-substituted hydrocarbyl.

19. The method according to claim 7, wherein the condensation catalyst is a tin(II) or tin(IV) compound.

20. The method according to claim 7, wherein the copolymer, comprises (i) $R^1SiO_{3/2}$ units, (ii) random $R^2_2SiO_{2/2}$ units, and (iii) linear $(R^3_2SiO)_n$ units, wherein $R^1$ is independently hydrocarbyl or halogen-substituted hydrocarbyl, $R^2$ and $R^3$ are independently $R^1$ or H, n has an average value of from 5 to 500, the mole ratio of $R^1SiO_{3/2}$ units to $R^2_2SiO_{2/2}$ units is from 1 to 30, and the mole ratio of $R^1SiO_{3/2}$ units and $R^2_2SiO_{2/2}$ units combined to $(R^3_2SiO)_n$ units is from 3 to 600 when the copolymer contains aliphatic unsaturation or from 1 to 600 when the copolymer is free of aliphatic unsaturation.

21. A method of preparing an organopolysiloxane copolymer, comprising combining (a') an organosilane having the formula $R^1SiX^1_3$ and (b') an organosilane having the formula $R^2_2SiX^2_2$ with (c) water in the presence of (d') a polydiorganosiloxane having the formula $X^3(R^3_2SiO)_pSiR^3_2X^3$, (e) an organic solvent, and (f) an alkali catalyst, to form a reaction mixture comprising an organic phase and an aqueous phase, wherein $R^1$ is independently hydrocarbyl or halogen-substituted hydrocarbyl; $R^2$ and $R^3$ are independently $R^1$ or H; $X^1$, $X^2$, and $X^3$ are independently a hydrolysable group that does not react with water to form an acid, or —OH; p has an average value of from 4 to 499; the mole ratio of (a') to (b') is from 1 to 30; and the mole ratio of (a') and (b') combined to (d') is from 1 to 600; for a time and at a temperature sufficient to form the copolymer.

22. The method according to claim 21, wherein $X^1$, $X^2$, and $X^3$ are independently —$OR^4$, —$OCH_2CH_2OR^4$, $Et(Me)C=N$—O—, $CH_3C(=O)N(CH_3)$—, —$ONH_2$, or —OH, wherein $R^4$ is $C_1$ to $C_8$ hydrocarbyl or halogen-substituted hydrocarbyl.

23. The method according to claim 22, wherein $X^1$, $X^2$, and $X^3$ are independently —$OR^4$, —$OCH_2CH_2OR^4$, or —OH, wherein $R^4$ is $C_1$ to $C_8$ hydrocarbyl or halogen-substituted hydrocarbyl.

24. The method according to claim 21, wherein $X^3$ is —OH.

25. The method according to claim 21, wherein at least one of $X^1$, $X^2$, and $X^3$ is a hydrolysable group and the concentration of (c) water is from 15 to 40 moles per mole of hydrolysable group in organosilane (a'), organosilane (b'), and polydiorganosiloxane (d') combined.

26. The method according to claim 21, wherein p has an average value of from 6 to 399.

27. The method according to claim 21, wherein the mole ratio of (a') to (b') is from 3 to 20.

28. The method according to claim 21, wherein the mole ratio of (a') and (b') combined to (d') is from 5 to 500.

29. The method according to claim 21, wherein the organic solvent forms an azeotrope with water.

30. The method according to claim 21, wherein the copolymer, comprises (i) $R^1SiO_{3/2}$ units, (ii) random $R^2_2SiO_{2/2}$ units, and (iii) linear $(R^3_2SiO)_n$ units, wherein $R^1$ is independently hydrocarbyl or halogen-substituted hydrocarbyl, $R^2$ and $R^3$ are independently $R^1$ or H, n has an average value of from 5 to 500, the mole ratio of $R^1SiO_{3/2}$ units to $R^2_2SiO_{2/2}$ units is from 1 to 30, and the mole ratio of $R^1SiO_{3/2}$ units and $R^2_2SiO_{2/2}$ units combined to $(R^3_2SiO)_n$ units is from 3 to 600 when the copolymer contains aliphatic unsaturation or from 1 to 600 when the copolymer is free of aliphatic unsaturation.

* * * * *